R. JARDINE.
CLIP FOR VEHICLE SPRINGS.
APPLICATION FILED NOV. 7, 1906.
912,684.
Patented Feb. 16, 1909.
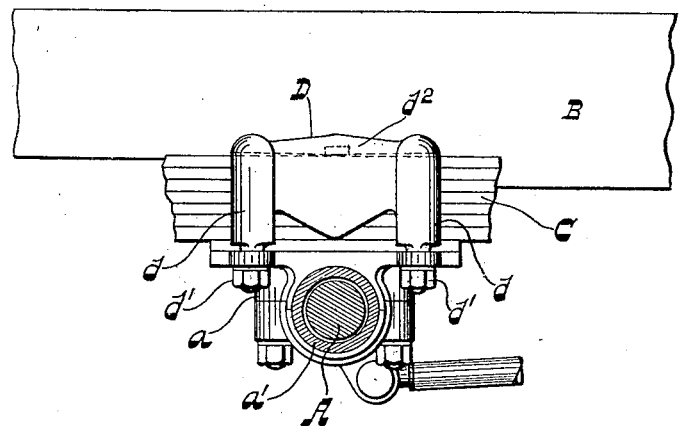
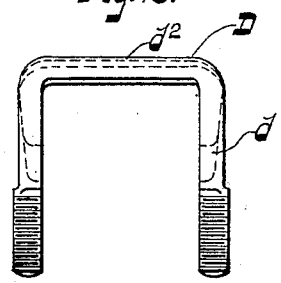
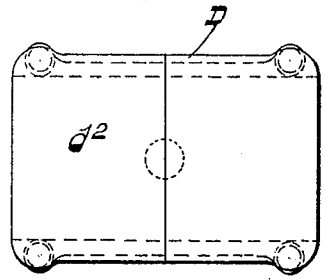
Witnesses:
Inventor,
Robert Jardine
by his attorney

UNITED STATES PATENT OFFICE.

ROBERT JARDINE, OF CLEVELAND, OHIO.

CLIP FOR VEHICLE-SPRINGS.

No. 912,684. Specification of Letters Patent. Patented Feb. 16, 1909.

Application filed November 7, 1906. Serial No. 342,316.

*To all whom it may concern:*

Be it known that I, ROBERT JARDINE, a citizen of the United States, resident of Cleveland, county of Cuyahoga, and State of Ohio, have invented a new and useful Improvement in Clips for Vehicle-Springs, of which the following is a specification, the principle of the invention being herein explained and the best mode in which I have contemplated applying that principle, so as to distinguish it from other inventions.

My invention relates to the art of vehicle construction and particularly to means for securing the springs of a vehicle to the seats provided for their reception on the axles of such vehicle or elsewhere about the same.

The object of the invention is the provision of a spring clip that will both firmly hold the spring in place, and, at the same time, preserve such spring against strains that would otherwise be liable to break it or at least, one or more of the leaves of which it is made up.

To the accomplishment of this object, said invention consists of means hereinafter fully described and particularly set forth in the claim.

The annexed drawing and the following description set forth in detail certain mechanism embodying the invention, such disclosed means constituting but one of various mechanical forms in which the principle of the invention may be used.

In said annexed drawing: Figure 1 represents a side elevation of my improved clip as applied to a spring in an automobile running-gear, the frame and spring of the automobile appearing in part only, and the axle and axle-bearing being shown in transverse cross-section; Fig. 2 is an end view of the clip alone and on a slightly larger scale; and Fig. 3 is a plan view of the same.

While shown in such drawing as applied to an automobile spring, it should, of course, be perfectly obvious that the clip in question is equally applicable to other types of vehicles. Its qualities, however, particularly commend it to the situation illustrated, for, due to the heavier load and greater speed of the motor-driven vehicle, the inadequacy of the old method of mounting the springs is in its case particularly evident. Such older construction, as is well known, generally involves the securing together of the leaves of the spring by means of a centrally-positioned bolt or rivet and then clamping the assembled spring to the spring-seat by means of two U-shaped clips, one on each side of such central point. The result of this arrangement is that the end edges of the spring-seat serve as fulcrums for the corresponding sides of the spring, and there is hence a pronounced tendency for the spring to rise between the two clips. The bolt tying the leaves together is thus subjected to an undue strain, and is very frequently broken off. Even when the bolt is not thus broken the leaves of the spring are apt to become loose and subsequent movements of the spring being excessive destroy the fiber of the steel and render the spring leaves peculiarly liable to fracture. The manner in which I overcome these several difficulties will be readily apparent from an inspection of the drawing, where, see Fig. 1, A represents the vehicle axle, B a side member of the vehicle frame, and C the spring mounted upon such axle and supporting the frame by means of suitable hangers, not shown.

Spring C rests upon a seat $a$ which, in this case, since the axle is rotatable, is provided with a box formed with a bearing $a'$ for the reception of such axle. To secure the spring to the seat, instead of using two clips disposed in the manner previously set forth, I employ a single clip D, the novel features of whose construction I shall now proceed to explain. Such clip comprises an integral structure made up of two end portions $d$, Figs. 1 and 2, of inverted U-shape, and having their lower open ends formed to extend through apertures therefor provided in spring-seat $a$. Such ends are further threaded to receive nuts $d'$, as will be readily understood. End portions $d$ of the clip are joined between their closed ends by an integral plate $d^2$ that also preferably extends some distance down either side so as to laterally inclose the spring when the clip is in place. The under face of plate $d^2$ is formed so as to incline upwardly from a central transverse line in each direction towards its junction with the U-shaped portions, as appears in Figs. 1 and 2 where this feature has been somewhat exaggerated in order to make it appear more plainly. The contour of the upper face of plate $d^2$ is preferably arched in order to still further strengthen the central portion of the same, the amount of such arching depending upon the rise or contour of the assembled spring. The prime object, however, in having the under face of the plate of the form described is not to strengthen such plate, but to cause the same to bear hardest at this point on the spring. In applying the clip, in other words, this portion will begin to contact first with the upper face of the spring, and as the nuts $d'$ are drawn tight will, when the closed ends of the U-shaped portions of the clip are brought into contact with such face, bear with considerably more pressure upon the spring than will the latter. As shown in Fig. 1, the clip has not as yet been drawn up tight, the U-shaped portions being out of contact with the top of the spring although the central portion of plate $d^2$ already rests thereon. There is hence no need, where this form of clip is used, to employ a tie bolt such as that above referred to, the clip not only taking its place but also more thoroughly protecting the spring against injury and obviating the necessity of drilling a hole through it. Where as a matter of convenience in handling springs before they are mounted on the vehicle, it is nevertheless desired to use such bolts to hold the leaves together, my clip may be readily adapted to accommodate the bolt head by being formed with a suitable recess on the under side of the plate $d^2$, as will be readily understood. The location of such suggested recess is indicated in dotted outline in Figs. 1 and 3.

It should be remarked that the downwardly arched contour of the under face of the clip is perhaps more conveniently obtained in the actual manufacture of the clip by introducing beneath the clip a thin plate of the proper thickness at the center and tapering away towards both ends, than by giving to the face of the clip itself the necessary convexity. It will hence be understood that when I refer to the connecting plate being thus formed, I do not necessarily imply that it is an integral structure.

The result of the use of a clip of the character above specified, such result being not only theoretically obvious but furthermore amply demonstrated by experiment, is the elimination of the buckling tendency of the middle part of the spring, for it is this part that is most securely clamped to the spring-seat. Freedom of vibration of the spring ends is not, on this account, circumscribed, but there is practically no movement of the spring leaves relatively to each other within the clip. The lateral portions of the connecting plate $d^2$ are designed to stiffen the clip and render the same more rigid and hence durable. Not only are the parts of the clip much less liable to be broken by a severe jolt or the like but the general resiliency of the spring is better maintained since when once it becomes loosened upon its seat, the individual leaves are more apt to receive an excess load and the whole structure in fact becomes unstable, consequences that are practically impossible where the improved clip is employed.

Having thus described my invention in detail, that which I particularly point out and distinctly claim is:

The combination with a substantially flat spring-bed and a spring resting thereon, of an integral clip for said spring, comprising two spaced U-shaped portions adapted to embrace the leaves thereof, and a plate joining the closed ends of such portions and laterally inclosing such spring, the under face of said plate inclining upwardly from a central portion in each direction to said plate's junction with said U-shaped portions.

Signed by me, this 5th day of November, 1906.

ROBERT JARDINE.

Attested by—
  D. T. DAVIES,
  JNO. F. OBERLIN.